(12) United States Patent
Grillenzoni

(10) Patent No.: US 6,692,544 B1
(45) Date of Patent: Feb. 17, 2004

(54) MUNICIPAL WASTE BRIQUETTING SYSTEM AND METHOD OF FILLING LAND

(75) Inventor: Mauro Grillenzoni, Modena (IT)

(73) Assignee: Ecosystems Projects, LLC, Albany, NY (US)

( * ) Notice: Subject to any disclaimer, the term of this patent is extended or adjusted under 35 U.S.C. 154(b) by 59 days.

(21) Appl. No.: 09/833,091

(22) Filed: Apr. 11, 2001

Related U.S. Application Data

(60) Provisional application No. 60/196,857, filed on Apr. 12, 2000.

(51) Int. Cl.⁷ ................................................. C10L 5/00
(52) U.S. Cl. ............................ 44/589; 44/590; 44/593; 44/595; 44/605; 44/606; 44/634; 44/635; 428/2
(58) Field of Search .......................... 44/589, 593, 595, 44/605, 634, 635, 606, 590; 428/2

(56) References Cited

U.S. PATENT DOCUMENTS

| | | | |
|---|---|---|---|
| 4,225,457 A | 9/1980 | Schulz | 252/373 |
| 4,227,653 A | 10/1980 | Jetzer | 241/24.19 |
| 4,426,042 A | 1/1984 | Hively | 241/21 |
| 4,540,467 A | 9/1985 | Grube | 162/4 |
| 4,540,495 A | 9/1985 | Holloway | 210/774 |
| 4,934,285 A | 6/1990 | Jormanainen et al. | 110/346 |
| 5,190,226 A | 3/1993 | Holloway | 241/23 |
| 5,265,979 A | 11/1993 | Hansen | 405/129.2 |
| 5,352,710 A | 10/1994 | Lauri | 521/137 |
| 5,361,994 A | 11/1994 | Holloway | 241/23 |
| 5,551,824 A * | 9/1996 | Zanzig et al. | 414/408 |
| 5,797,972 A | 8/1998 | Schulz | 44/552 |
| 5,826,808 A * | 10/1998 | Giovanardi | 241/27 |
| 2002/0184816 * | 12/2002 | Philipson | 44/589 |

FOREIGN PATENT DOCUMENTS

DE 3714509 11/1988

* cited by examiner

Primary Examiner—Cephia D. Toomer
(74) Attorney, Agent, or Firm—Cheryl H. Agris

(57) ABSTRACT

Mechanically and biologically stable briquettes and pellets are obtained from either municipal solid waste (MSW), Refuse Derived Fuel (RDF) or municipal sewage sludge and their combination for purposes of disposing said briquettes and pellets as fuel in waste-to-energy processes such as the one described herein or to form geometric aggregates with such briquettes for their disposal at landfill sites. The use of binding material is not required whereas fuel additives such as crushed coal and petroleum residues may be added to enhance fuel performance but are not needed to improve waste processing or product stability and mechanical properties.

10 Claims, 7 Drawing Sheets

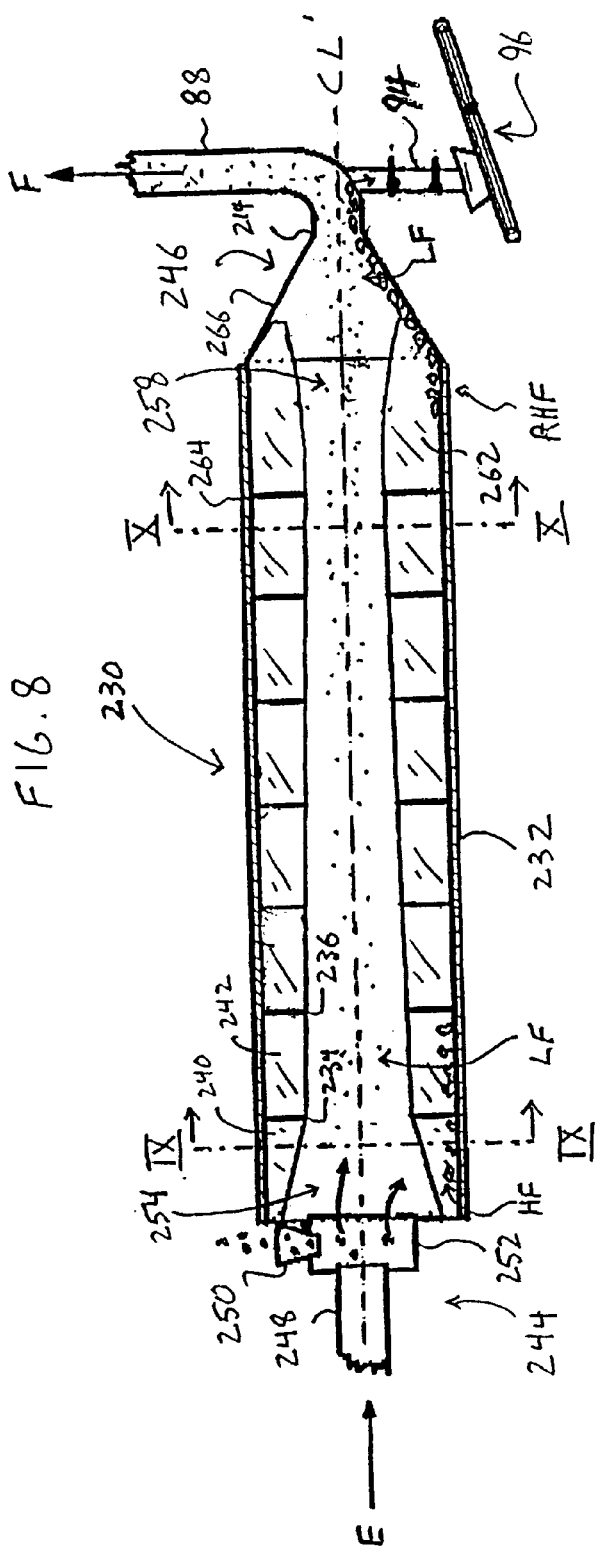
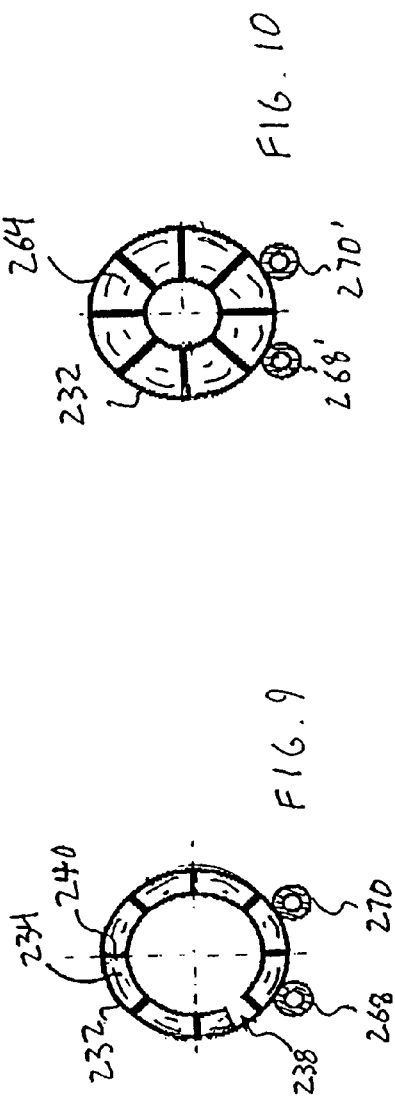

US 6,692,544 B1

MUNICIPAL WASTE BRIQUETTING SYSTEM AND METHOD OF FILLING LAND

RELATED APPLICATIONS

This application claims priority from U.S. provisional application serial No. 60/196,857, Filed Apr. 12, 2000 of same title.

FIELD OF THE INVENTION

This invention relates to the field of waste disposal. In particular, this invention relates to the field of municipal waste disposal, including disposal of municipal solid waste (MSW), refuse derived fuel (RDF), biomass, discarded tires, and sewage sludge. Briquettes which may be produced according to the present invention may be used as landfill or as alternative fuel sources.

BACKGROUND OF THE INVENTION

The disposal of municipal waste, including both solid waste, or "garbage", and sanitary waste, or "sewage" is clearly a major economic concern for western society in the 21st century. Conflicting demands of technique, regulation, and politics create a rich field for invention and innovation. A waste stream emanating from a major urban center may include both municipal solid waste (MSW) and sewage sludge—a semi-solid residual fraction resulting from chemical and physical treatment of septic human wastes in sewage or water pollution control plants requiring eventual disposal in landfill or by deep water dumping. The waste stream may also include pre-separated sub-streams, including for example refuse derived fuel (RDF) and biomass. RDF is a partially separated or processed fraction of solid waste containing a higher proportion of waste paper, wood chips and other combustible materials, and substantially free from metals and inorganics, and thereby suitable for use as a fuel. Biomass comprises disposed plant material, often yard waste or such material cleared from land as a fire preventative measure, and is primarily cellulosic, and often has a high moisture content.

Aims in the disposal of municipal solid waste are, as always, economic, and the various objective to which an economic value may be attached are: reduction in landfill airspace volume used; reduction in landfill leachate or run off; reduction in landfill effluent gasses; production of useable energy from waste; recovery of useable waste fractions from the waste stream; and reduction in air pollution resulting from waste combustion. A "traditional" method of waste disposal may be characterized as dumping of an undifferentiated waste stream in an open location, which, in a slightly modified form, becomes creation of so-called sanitary landfill, with some effort at ground water protection, compaction, and covering. A traditional method of waste disposal is being phased out in most locations, including the developing world, where large waste reclamation and control projects are being undertaken; albeit a large fraction of global waste is still disposed of in an approximately traditional manner, modified by informal recycling efforts, or "garbage picking"

In moving from a traditional system to one meeting one or several of the above listed objectives, one encounters the characteristic economic problem of tradeoffs, or conflicting objectives. Notwithstanding, multiple objectives may be simultaneously advanced beyond a level of undifferentiated open disposal of waste, with an optimal mix determined by local conditions, and available technology.

Municipal waste buried in landfill is subject to slow degradation under microbial action, producing effluent gases, as well as objectionable odors. Chief among landfill effluent gasses is methane, which is thought to be a contributor to global warming and ozone destruction. Methane can be collected by post-fitting existing landfill with gas collection systems, and may be evolved in usable quantities over a 50 year period following waste disposal. Burned as fuel, the methane is effectively substituted by carbon dioxide as an effluent, which may still contribute to global warming. It is estimated that only about one quarter of the potentially useable energy of a waste pile can be recovered this way, however, relative to methods employing direct burn, or burn after processing. Gas production does have an advantage of yielding a clean burning fuel; heavy metals and problem compounds are left behind in the ground, in the dump, rather than possibly being injected into the atmosphere on combustion, and requiring scrubbing technology to partially ameliorate.

Conventional waste disposal landfill has a disadvantage of dimensional instability, which, coupled with gas evolution, make such a site unsuitable for reclamation for other use for a period of at least 50 years.

Compared to landfill gasification, a more rapid production of fuel gas from waste is possible by placing the waste in specially designed reactors for the acceleration of bio-fermentation.

A production of pellets and briquettes from solid waste streams and sewage sludge is known in the art, with numerous recipes reciting a mixing of the waste stream with coal or other binders. Existing patents concentrate on a evaluation or characterization of physical-mechanical properties of the resulting briquettes and pellets, and on an ability of these briquettes to undergo waste-to-energy transformation, in particular for production of electric power.

A use of pellets and briquettes as a fuel stuff in a waste-to-energy or refuse-derived fuel (RDF) fired plant was introduced by Schulz in U.S. Pat. No. 4,225,457. Briquettes of specified geometry and composition are produced to serve as feed material or burden in a moving-burden gasifier for a synthesis of fuel gas from organic solid waste materials and coal. The briquettes are formed from a mixture of shredded organic solid wastes, including especially municipal solid waste (MSW) or biomass, and crushed caking coal, including coal fines. A binder may or may not be required, depending on a ratio of Coal/MSW, and compaction pressure employed. Briquettes may be extruded, stamped, or pressed, employing compaction pressures in excess of 1000 psi, and preferably in the range of 2000 to 10,000 psi. A ratio of caking coal to shredded municipal solid waste is selected so that each part of a predominately cellulosic organic solid waste will be blended with 0.5 to 3.0 parts of crushed coal. Suitable binder material include dewatered sewage sludge, "black liquor" rich in lignin derivatives, black strap molasses, waste oil and starch; when used, a binder concentration is preferably in a range of 2 to 6 percent.

In U.S. Pat. No. 4,426,042, entitled "Method of Shredding Solid Waste", an improved method of shredding MSW or garbage is disclosed, which maintains the moisture content of the waste. The shredded waste is then available for efficient disposal or further processing. In U.S. Pat. No. 4,934,285, entitled "Method for Treating Waste Materials", there is described a method for treating waste materials which divides the waste material into a compost fraction and a refuse-derived fuel fraction, wherein the compost fraction is exposed to a biological treatment to produce a gaseous fuel. The refuse-derived fuel is burned at high temperature, and the exhaust gases are routed into an after-burning chamber, along with the gaseous fuel from the biologically decomposed compost.

In U.S. Pat. No. 4,227,653, entitled "Method of Processing Waste Materials", moist municipal waste is subjected to a preliminary comminuting action to reduce particle size, and the larger heavy particles are segregated from lighter particles which include relatively small fibrous particles and relatively large additional lighter particles. The relatively large additional lighter particles are then segregated from the relatively small fibrous particles and subjected to a severing action to reduce their size to a size not exceeding that of the small fibrous particles. The fibrous particles are then mixed with the severed additional particles, the mixture is dried and ozonized, and portions thereof are used for the manufacture of shaped articles.

In U.S. Pat. No. 4,540,467 entitled "Method of Fragmenting Municipal Solid Waste", a method and apparatus is disclosed for the removal of mold core material from metal castings and for fragmentation of municipal waste materials, e.g. paper products. The method involves heating and hydrating the materials within a pressure vessel. In U.S. Pat. No. 4,540,495 entitled "Process for Treating Municipal Solid Waste", a process for treating MSW material in the presence of moisture is disclosed, aimed at the recovery and separation of inorganic and organic matter. In U.S. Pat. No. 5,190,226 entitled "Apparatus and Method for Separation, Recovery and Recycling Municipal Solid Waste and the Like", there is disclosed an apparatus and method for separation and recovery of MSW, via the introduction of solid waste material into a rotatable pressure vessel, which vessel rotates, pressurizes and heats the waste material while simultaneously applying an extruding action. The extruding action is achieved by a rotatable extruder mechanism in the pressure vessel which forces the processed solid waste material through a constricted area adjacent the exit of the vessel.

In U.S. Pat. No. 5,265,979 entitled "High Efficiency Waste Placement System for Municipal Landfills", the solid waste is placed in a preselected geometric form to form a waste pile, followed by coating of the exposed portion of the pile with a synthetic cover compound comprising a liquid, binder, cellulose fibers, and plastic fibers, followed by what is termed "biostabilizing" the pile, and compaction. In U.S. Pat. No. 5,352,710 entitled "Neither Toxic Nor Environmentally Noxious Foamed-Polymer Products", a cellular or foamed-polymer product is disclosed formed by the combination of a variety of polymer foam-forming compounds. The cellular or foamed polymer products are then said to be safe with regards to health and environment, and therefore disposable as waste similar to municipal solid waste. U.S. Pat. No. 5,361,994 entitled "Apparatus and Method for Preparation and Separation, Recovery And Recycling of Municipal Solid Waste And The Like", there is disclosed a pressure vessel for subjecting waste material to heat and pressure while simultaneously applying an extruding action to the solid waste. The extruding action is achieved by a rotatable extruder mechanism, similarly to U.S. Pat. No. 5,190,226.

U.S. Pat. No. 5,797,972 to Schultz discloses a sewage disposal process and product: Mechanically stable pellets or briquettes useful as fuel result from combining a major portion of sewage sludge solids with lesser amounts of lime and binder materials suitable for imparting stability to a pressed or extruded product. Coal may also be included in the pellet or briquette composition, but is not essential. The products contain 50 to 95% dry weight percent sewage sludge solids, with a typical value of around 70%.

As may be seen upon the above review of the prior art, numerous efforts have been explored to improve upon the processing of MSW, with the objective of producing a product that is either densified or converted into a fibrous or particulate form, so that it can be better separated from a commingled waste stream and be made to take up less room in a landfill, or can be burned as fuel with a higher energy output per pound mass of fuel. However, as is also clear from the above review, there are limited reports and emphasis on the fact that MSW itself could somehow serve as a direct substrate for the production of a molded products, if somehow MSW could be modified into a non-toxic and useful solid feed resin-type material.

As discussed above, briquetting is known as a method of compressing a relatively high quality fraction of municipal waste into a form suitable for use as fuel. It is not known nor thought practical to incorporate significant quantities of lower-quality waste streams in a briquetting process for eventual use as fuel, nor to produce, from mixed waste sources, briquettes of sufficient chemical and biological stability for long term disposal by burying without an unacceptable degree of decomposition.

Briquetting is not the same as pelletizing waste. Many waste operator and regulatory agencies in this country are familiar with a technique which produces pellets from waste streams. Pelletizing has not proven to be a practical solution to the problem of waste reduction: In the pelletizing process a final product generally has a moisture content of 20% or more, which results in degradation, fermentation and dimensional instability. Pellets can be used in thermal destruction plants, but can not be stored at a landfill site for an extended period of time without fermentation and expansion in volume.

OBJECTS OF THE INVENTION

It is an object of this invention to provide an efficient way of disposing of municipal solid waste, sewage sludge, and admixtures thereof.

It is a further object of this invention to manufacture a product from municipal solid waste and sewage sludge which is volumetrically compact compared to other forms of these materials.

It is yet a further object of the invention to manufacture a product in accordance with the previous objects which is dimensionally stable.

Yet another object of the invention is to manufacture a product from sewage sludge and municipal solid waste which is stable after sustained exposure to precipitation and rainwater.

Still a further object of the invention is to effect a landfill airspace savings through volumetric reduction of municipal-solid-waste-derived material for incorporation in landfills Another object of the invention is to process municipal solid waste into a form which does not emit detectable levels of offensive odors.

A related object of the invention is to process municipal solid waste into a form which will not produce significant gaseous by-products of fermentation and decomposition under conditions encountered in a landfill.

A further related object of the invention is to produce a refuse derived fuel which may be stored for extended periods of time or transported without unacceptable decomposition.

Any one of these and/or other objects of the invention may be readily gleaned from a description and illustrations of the present invention as described herein.

SUMMARY OF THE INVENTION

The invention relates to a process for the production of mechanically stable and biologically inactive briquettes or pellets suitable to be used in waste-to-energy processes, or to be disposed at landfill sites for enhanced air volume conservation. A key to the successful features of this process is an end product which is aseptic, and will remain biologically inert for decades under conditions encountered in a landfill facility.

Mechanically and biologically stable briquettes and pellets are obtained from either municipal solid waste (MSW), refuse derived fuel (RDF) or municipal sewage sludge and their combination for purposes of disposing said briquettes and pellets as fuel in waste-to-energy processes or to form geometric aggregates with such briquettes for their disposal at landfill sites. A use of binding material is not required, and whereas fuel additives such as crushed coal and petroleum residues may be added to enhance fuel performance, these additives are not needed to improve waste processing or product stability or mechanical properties. An absolute lack of any required binding material is a relevant factor establishing a useful novelty of the instant process over those otherwise described in the prior art, such as U.S. Pat. No. 5,797,972 to Schultz or U.S. Pat. No. 3,910,775 to Jackman.

In summary, a waste processing method in accordance with the present invention involves the following steps:

(i) reduction of a distribution of particle size by operation of at least one hammer mill shredder;

(ii) passage of the resulting fluff through a rotating kiln dryer, which also effects a separation into heavy or inert (metal and inorganic) portions, and an airborne portion; and (iii) following removal of exhaust gasses in a cyclonic separator, feeding of substantially dried fluff into a twin screw extrusion machine for production of extrudate.

Other steps include scavenging of ferrous metals, screening, and cutting of extrudate into uniform sized blocks. An additional major improvement of the present invention with respect to the prior art is an ability to process a plurality of waste streams, such as MSW, RDF, tires and sewage sludge, by invariably producing briquettes or pellets with superior mechanical properties and biological features, without a use of any binding material or additive.

The present invention also relates, in one of its many aspects, to a process of producing briquettes and pellets of suitable shape and dimensions to be arranged (stacked) in geometric aggregates which facilitate a disposal of such briquettes and pellets at landfill sites by at the same time introducing a significant savings in transportation cost to a landfill site and substantially reducing an environmental and social impact associated with transportation of MSW and sewage sludge from a production or collection site to a landfill or other disposal site. The invention also relates to a method of controlling final residual moisture and density, by varying, among other parameters, a size of waste material after shredding, an extrusion speed, a selection of extrusion die, a cut-off dimension and thereby, indirectly, a temperature profile inside an extrusion equipment, in order to obtain products of desired properties, according to a final market application or destination.

The general aim of a process in accordance with the present invention is to resolve the shortage of landfill space experienced in densely populated areas of the country, by volume reduction of the waste by compaction, and possible diversion of waste to energy applications.

According to another central aspect of this invention, a typical municipal solid waste stream input density in a range of 400 to 600 lb/yd$^3$ may be increased at an output of a waste processing plant in accordance with the present invention to between about 1,000 and 3,000 lb/yd$^3$, preferably 2,000 to 3,000 lb/yd$^3$, more preferably 2,000 to 2,400 lb/yd$^3$; a 4 to 5-fold improvement in packing density or compression. This enhancement of density when combined with a method, also introduced in connection with the present invention, of assembling processed briquettes in packs and/or geometric formations with a bulk density close to that of isolated single briquettes usually yields landfill airspace volume usage two to three times lower than that obtained at landfills by compacting MSW. In other words, a landfill employing the present methods may be expected to achieve a packing factor of at least twice that obtainable with existing technology of dumping of an uncompacted solid waste stream followed by an in situ compaction utilizing heavy earth-moving equipment.

To achieve claimed densities, briquettes must be disposed in a uniform geometric pattern, rather than merely tumbled, into the landfill. A close packed pile of briquettes occupies approximately ⅔ a volume of an equivalent mass of randomly piled briquettes; so an additional volume reduction factor of at least about ⅓, in addition to reductions resulting from waste compression, may be achieved by close packing. In practice, the briquettes are packed and strapped in uniform blocks for transport, of the order of 1 to 3 cubic yards in volume. These blocks may be packed at a density not less than 90% that of individual briquettes, allowing for irregularities and packing errors, owing to an ability to produce essentially rectangular briquettes via a choice of exit die on an extrusion machine, and a perpendicular cutoff saw. The blocks may be handled by clamping at a landfill site, with final positioning and packing by heavy equipment. Blocks gain in handling strength over a straight stacking via packing in an "English bond" or "common bond" pattern, as is known in brick-laying, and will be described in detail herebelow.

It is also possible and advantageous in some applications to produce extruded product of an intermediate density range, of between 1,000 and 1,400 pounds/cubic-yard, for use for example in cement plants, where a lower density fuel is required and there is no requirement for biological inactivity. In general a requirement for biological inactivity is relaxed in fuel applications as compared to use in landfill, except insofar as an aseptic condition improves shelf-life and limits odor problems in an application where fuel is not to be burned nearby, with a short inventory turnover. In general it is found that a final density of 1,600 pounds/cubic-yard or more is required for a biologically inactive product, which can be landfilled or possibly otherwise stored for subsequent use as fuel.

An ability of the process of the present invention to handle commingled waste streams at design capacity of the plant may be partially hindered by a percentage composition of a composite stream. In particular, preponderant amounts of sewage sludge (above 30%) may require the introduction of a modified kiln in order to maintain a quality of output of the plant within design required output parameters. In this case a waste processing plant in accordance with the present invention includes 2 separate kilns; dried wastes from these two kilns are then mixed before entering the briquetting machine.

Independent of a relative amount of sewage sludge, partially dewatered in a filter press or in a belt press, a maximum moisture of 15–20% should be attained in the mass of sludge before this can be fed into the extruder. Heat necessary to evaporate excess residual sewage sludge moisture may be obtained by burning landfill biogas, if the plant is operating near or at a landfill site, natural gas, fuel oil, or a portion of the briquettes produced by a plant operating in accordance with the present invention. In case a thermally activated second sludge drying stage is contemplated, an acid-basic solution scrubber is ideally used followed by an ozone treatment unit, to eliminate possible noxious odors in an exhaust gas plume from a treatment plant operating in accordance with the present invention.

A method for processing a composite municipal waste stream with a method in accordance with the present invention contain three main elements, as will be laid at greater length in a detailed description section below:

(1) A step employing a rotating kiln, heated by a methane or gas burner, capable of producing a waste intermediate with residual moisture content of about 10%, and also removing ferrous and non-ferrous metal particles and inert materials.

(2) A step employing a twin screw extrusion or briquetting machine capable of executing an extrusion operation further reducing a moisture content of a processed waste stream to approximately 5% while maintaining an extrudate temperature between 250 and 280° F., so as to produce an essentially biologically inert or aseptic briquette. The extrusion process does not make use of binders, but rather controls a temperature profile within the extrusion machine in order to obtain desired product characteristics.

(3) A method of forming and assembling the briquettes in geometric packs of different size and shape, and of optimizing a disposal of the packs in landfills, lowering air space requirement by a factor of 50–70%.

Further considering the kiln or dryer, which is an integral part of a best mode the present invention, a preferred design includes several provisions for a safe operation of a waste processing plant, which have been tested at prototype facilities:

A concurrent flow of heated air and material allows the material to be in contact with the hottest air at the time the material contains the highest level of moisture, thus minimizing a risk ignition of paper and plastic, or other materials with a low flash point. In the unlikely event of fire, three valves located on three different water lines will open in sequence. The first two will open automatically to ensure immediate action and the last one opens manually. The opening of the last valve triggers the initiation of the plant shut down sequence.

Further considering the briquetting machine; a front section includes an electric motor with rating of 400 to 1,000 kW, the motor controlled by an inverter and a gear reducer, which in turn assures and controls a proper rate of rotation for the screws. The screws are built in a high wear resistant alloy and have a diameter of 400 mm to 800 mm. When handling Municipal Solid Waste the 400-mm screws are capable of delivering over 4 tons of extrudate ranging 4 to 7 inches in size, while a similar briquetting machine assembled with two 800-mm screws can deliver up to 10 tons of briquettes of a similar size. Smaller briquettes can be produced by the larger machine at a cost of reduced productivity. Thermocouples located inside the machine monitor and facilitate control of a temperature profile of in-process extrudate. The extrudate, coming off the briquettes, slides onto a take-off roller used to control shape and dimensional stability of the still-soft briquettes. Metal guides on both sides of the roller assure the confinement of the extrudate.

The briquettes subsequently harden with cooling and exposure to air, and to complete sizing a cut-off saw, located downstream from a take off roller of each briquetting machine cuts the briquettes at the desired length. The saw comprises a sturdy frame and a system of idle rollers supporting a motorized belt which in turn supports and draws the briquette to the cutting zone. The cutting unit comprises a circular saw mounted on an idle cart, controlled by a photo-cell actuated motorized cam. A vertical movement of the slitter is controlled by a crank-connecting-rod system and a gear reducer.

The process described above provides a cost competitive and environmentally safe alternative for disposing MSW at landfill sites and extends their residual life. Combustion fumes produced by either natural gas or landfill gas are washed by a jet scrubber before release to the atmosphere.

Fume contaminants are mainly composed of particulate matter in amounts ranging 50 to 150 mg/m$^3$. A use of natural gas as a fuel limits emissions of SOx within regulatory norms without specific treatment. The pH of a washing solution employed in the jet scrubber is continuously monitored to identify the presence of unexpected acid or basic contaminants. A dual acidic/basic solution system is available to bring pH values within limits, and is especially needful in a presence of significant quantities of sewage sludge.

Liquid effluents generated by the process, such as leachates coming from drains and condensate originated in the scrubber, are treated before release to a municipal sewer.

Aseptic briquettes (produced by methods according to the present invention) comprise a mixture of at least one component selected from the group consisting of sewage sludge solids, municipal solid waste and refuse derived fuel. Briquettes according to the present invention comprise about 5% to about 100% by weight paper and plastics with a preferred range of about 10% to about 85% by weight paper and plastics, more preferably about 15% to about 75% by weight paper and plastics and in certain cases about 20% to about 50% by weight paper and plastics. These briquettes have the following preferred characteristics:

1) a density ranging from about 500 to about 5,000 lb/yd$^3$, preferably about 1,000 to about 3,000 lb/yd$^3$, even more preferably about 2000 to about 2750 lb/yd$^3$ or alternatively, about 2000 to about 2400 lb/yd$^3$;

2) a moisture content of less than about 10% by weight, more preferably less than about 7–8% by weight, and in certain preferred embodiments, less than about 5% by weight;

3) storable under average daily temperate zone conditions for a period of at least about one year (i.e., without losing a mass percentage greater than about 5%, more preferably without losing a mass percentage greater than about 2% per year) to decomposition processes biologically and chemically inert under conditions encountered in a landfill for a period of at least about 3 years, preferably at least about 5 years, more preferably at least about 20 years and even more preferably at least about 50 years or more.

4) compressive strength ranging from about 500 psi (pounds per square inch) to about 15,000 psi, preferably about 5,000 psi to about 10,000 psi, more preferably about 8,000 psi to about 10,000 psi; and 5) preferably, metals are removed to a level no greater than about 0.3% by weight. In certain alternative fuel aspects of the present invention, the briquette according to the present invention further includes crushed coal and/or petroleum in an amount ranging from about 0.5% to about 50% by weight, preferably about 5% to about 25% by weight.

BRIEF DESCRIPTION OF THE DRAWINGS

FIG. 8 is a longitudinal cross section of a second embodiment of a kiln.

FIG. 9 is a cross section of the kiln of FIG. 8.

FIG. 10 is another cross section of the kiln of FIG. 8

DETAILED DESCRIPTION OF THE INVENTION

Figure 1A:
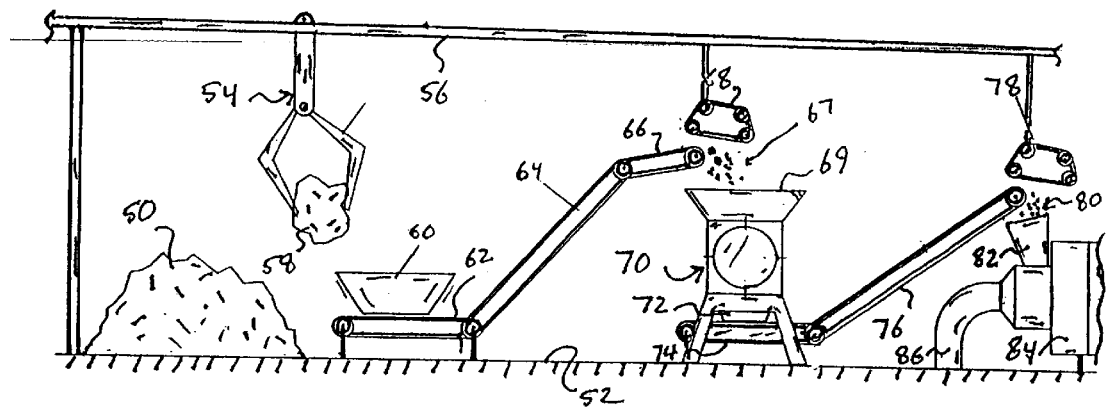
FIG. 1A is a schematic elevation of a waste processing line in accordance with the present invention.
Figure 1B:
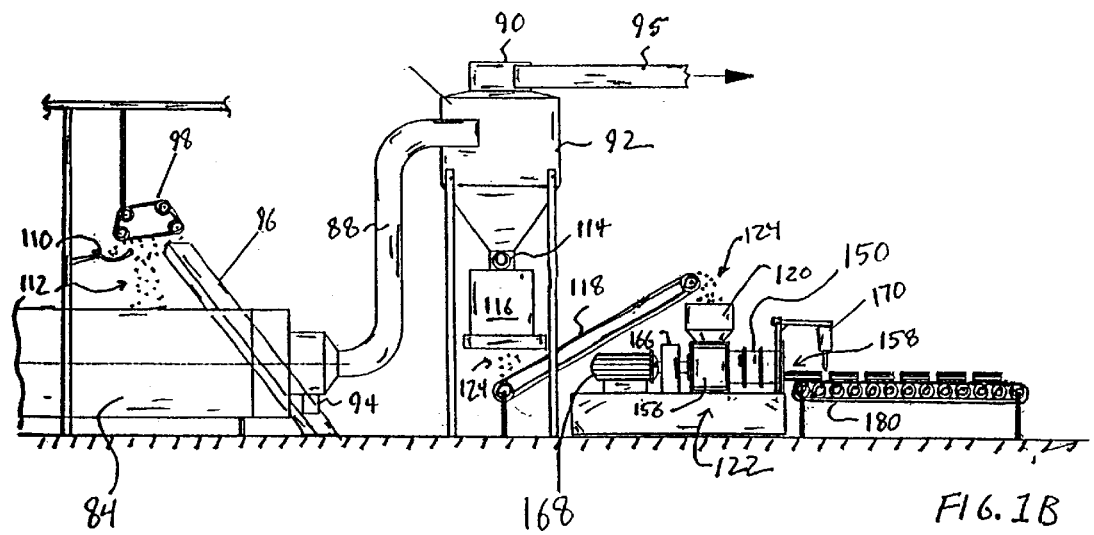
FIG. 1B is a continuation of the schematic elevation of FIG. 1A

A schematic diagram of a waste processing line is shown in FIGS. 1A, 1B. A mound 50 of municipal solid waste (MSW) is prestaged on floor slab 52. Mobile or gantry crane 54 mounted on an overhead 56 seizes a moiety 58 of MSW for loading into a first hopper 60. The first hopper optionally includes a shredder (not shown) for accomplishing a first reduction of size of MSW particle size. Hopper 60 also functions as a material buffer, smoothing a batch feed of MSW into a continuous flow waste stream (not separately designated). The waste stream then proceeds up a first belt system 62, 64, 66 for emptying in a second hopper 69 feeding a hammer mill 70. While entering hopper 69 waste stream segment 67 is exposed to a first magnetic overhead belt 68 for a first separation and subsequent recovery (not shown) of ferrous metals. The hammer mill, well known in the waste processing art, includes rotating sets of swinging steel hammers (not visible) through which the waste stream is fed, which reduces over 95% of the stream to sizes of about 3 to 4 inches or less. Following this treatment, it is usual in the art to refer to a partially processed waste stream, and in particular, a light fraction of a partially processed waste stream excluding fines, as "fluff".

Beneath the shredder a third hopper 72 collects and dumps the further processed waste stream (not shown) onto a conveyor 74 of a second conveyor system 74, 76. Above conveyor 76 a second magnetic overhead belt 78 provides a second separation of ferrous metals. Processed waste stream segment 80 now comprises a mixed material known in the art as "fluff".

From conveyor 76 the fluff is fed directly into a rotary kiln 84 by means of a forth hopper 82 and a belt (not visible); the belt is equipped with an overflow device (not shown) so that by automatically controlling a level of fluff on the belt and the speed of the belt an adequate flow of fluff to kiln 84 is assured. The rotary kiln, heated by a methane or waste gas burner (not shown) is designed to reduce a maximum moisture content of the fluff to 10–15%, and to assure that a temperature reached at the end of the briquetting phase will be at least 200° F., and preferably above about 245° F., which temperature guarantees a biological inactivity or aseptic condition of the briquettes. A material flow through the kiln is aided by a flow of heated exhaust or flue gas and entrained air from the methane burner through a first plenum 86, which flow is exhausted from the kiln at a second plenum or riser 88. Kiln 84 is shown in continuation from FIG. 1A in contiguous FIG. 1B, and in one embodiment, in cross section in FIG. 2.

In one embodiment, an internal cylindrical rotating drum 100 of rotary kiln 84, supported on roller bearings 101, 101', 101" is equipped with paddles 102, 102', 102" et al. mounted on an inside surface of the rotating drum. The paddles increase the contact area between the heated flue gas and air and the waste stream or ground material 80; the hot gas produced by the burner is introduced into the kiln through nozzles (not shown) which create an advantageous air turbulence for a superior heat/mass exchange between air and waste material. Internal drum 100 is contained within an outer fixed drum or shell 104, so that kiln 84 employs a double wall, fixed and rotating drum, construction. Between drums 100 and 104 is formed an annular space or void 106, through which flue gas can also pass in an auxiliary flow in a direction generally from first or inflow plenum 86 to second or exhaust plenum 88, which auxiliary flow aids in heating inner drum 100 on a surface opposite from a mounting surface of paddles 102 et al., assisting in a uniform heating of waste stream or fluff 80.

Figure 5:
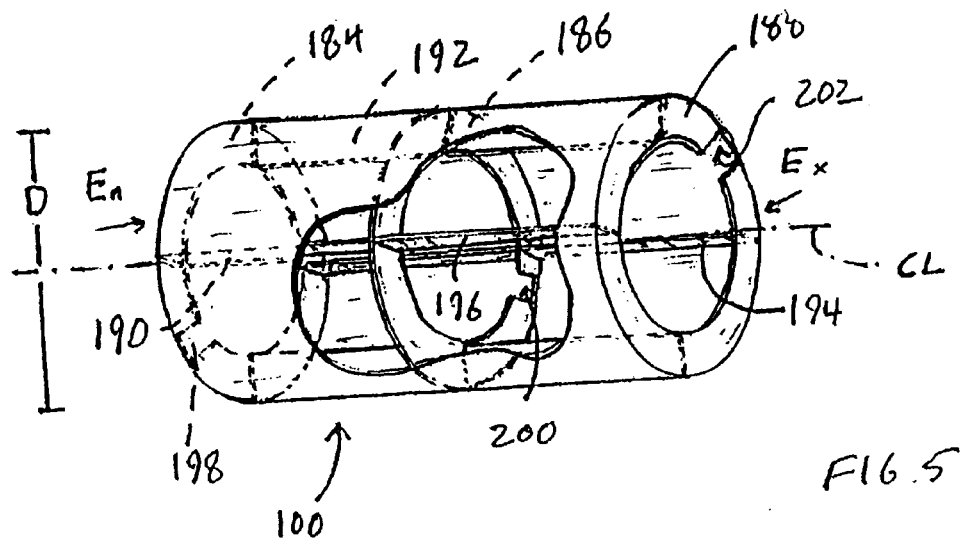
FIG. 5 is partially a transparent schematic perspective view and partially a cut-away of a rotating drum of a modified version of the kiln of FIGS. 1A, 1B and 2.

A more detailed view of cylindrical rotating drum 100 of kiln 84 is shown in FIG. 5. The drum is mounted internally with a series of ring-shaped concentric baffles 184, 186, 188. The baffles are regularly spaced, and concentric with a center-line or longitudinal axis CL of drum 100. A number of baffles may in general vary from 4 to 8 according to a size of the drum and a volume and composition of waste material to be treated; 3 baffles are shown only for illustrative purposes.

Figure 2:
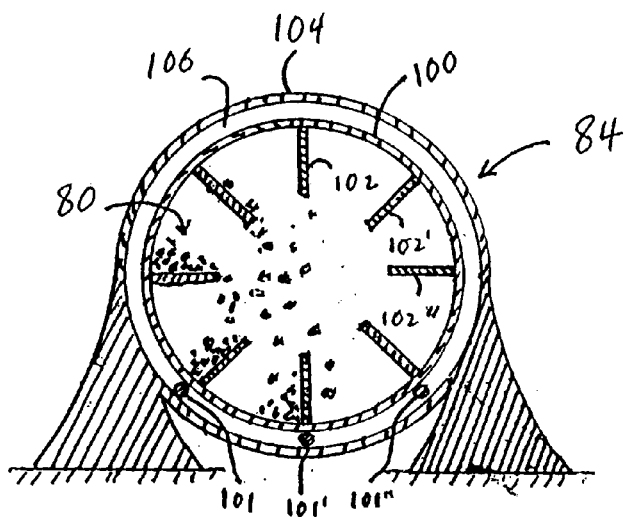
FIG. 2 is a cross-section in elevation of a kiln utilized in a process according to the present invention.
Figure 3:
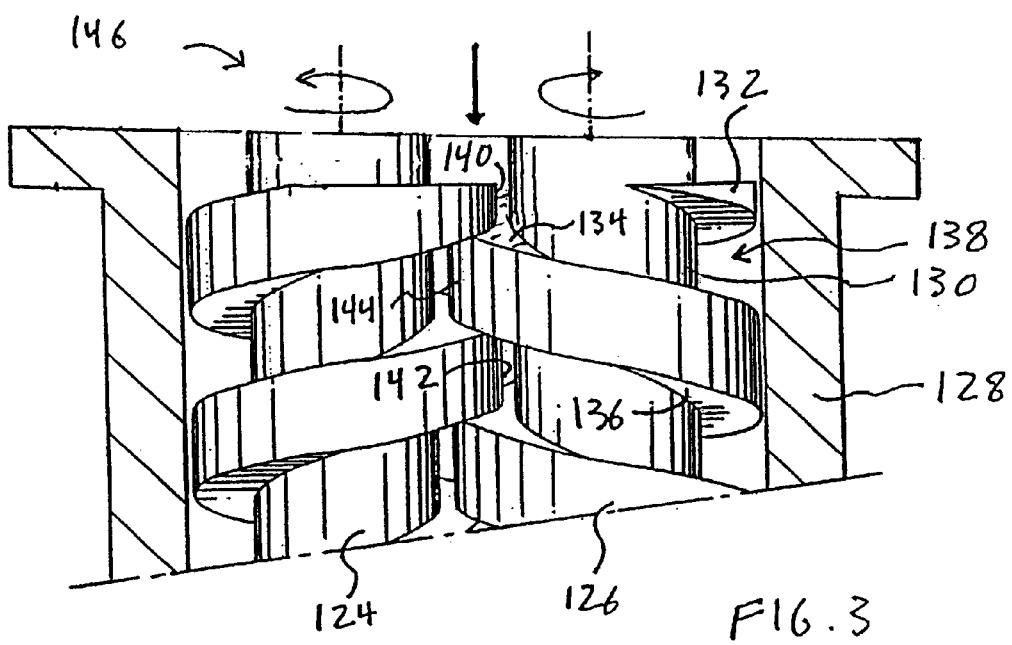
FIG. 3 is a plan view of a twin screw extruder mechanism.

Baffles 184 are connected by means of paddles 190, 192, 194, 196, which may be construed as analogous to paddles 102 et al. of FIG. 2, being of a smaller number in an embodiment intended to treat a waste stream of larger mean particulate size in relation to a diameter D of the drum. Rings 184 et seq. are provided with radial slots or gaps 198, 200, 202 respectively, for the passage of heavier components of the waste stream, such as metals, "inerts" (ceramic or refractory materials such as stone, brick, cement, pottery) and glass along a length of the drum during a drying operation. The slots are staggered in angle of rotation (not separately indicated) about longitudinal axis CL, as seen from an end-on view of a rotating drum, as that of FIG. 2. A length of the drum along axis CL lies within a range of 4 to 6 times the diameter.

Drum 100 is rotatable about axis CL by a drive system comprising a rack and pinion system driven by an electric motor equipped with a reducing group comprised of a variable pulley and a gear box: the drive system is believed to be standard in the industrial arts and is not illustrated. A drum rotation speed is controlled by means of the variable pulley within a range of 1 to 12, preferably 4 to 6 revolutions per minute.

In a generally elongated apparatus through which a material flow and a fluid or gas flow is contemplated, such as kiln 84, the two flows may either be generally concurrent (parallel) or counter-current (anti-parallel), and that a concurrent flow of heated air or exhaust gas and waste material is selected in an operation of kiln 84. A concurrent flow of heated air and material allows the waste material to be in contact with the hottest air at the time the material contains a highest level of moisture, thus minimizing a risk of ignition of paper and plastic, or other materials with a low flash point.

As a stream of waste particulate from the hammer-mill is introduced into the kiln at an entry end En (FIG. 5), vanes 190 et al., or 102 et al. (FIG. 2), function in a lifting, mixing and dropping of the waste through the flow of heated gas, increasing a net surface area available between waste and gas for moisture transfer and heating. As a lighter fraction of the waste particulate is dried, the particulate decreases in density and becomes partially entrained in the flow of gas, exiting the kiln via plenum 88 feeding cyclone 92. Insufficiently dried material from the lighter fraction of the particulate, and a heavy or inert residual fraction of the waste particulate, remains resting on a floor, or temporarily upward oriented portion of an inner surface of the drum, and on an appropriately oriented subset (not separately designated) of the vanes. During a drying operation progressively larger quantities of particulate are sufficiently dried and air-entrained, while the residual fraction remains behind on the inner surface. Since the heavy residual fraction will never decrease in density by drying, hence have an inordinately long dwell time in the drum, a mechanism is provided to expedite a passage through the kiln. The radial slots permit a slow passage of heavy inert material through the drum until eliminated at drop tube 94, as discussed more completely below. In alternative embodiment (not illustrated) vanes 192 et al. are given a fixed rotation about a radius of the drum in order to impel heavy material along the drum. The vanes may also be given a non-planar geometric shape, as, for example, helicoid, to aid in a movement of material.

Figure 6:
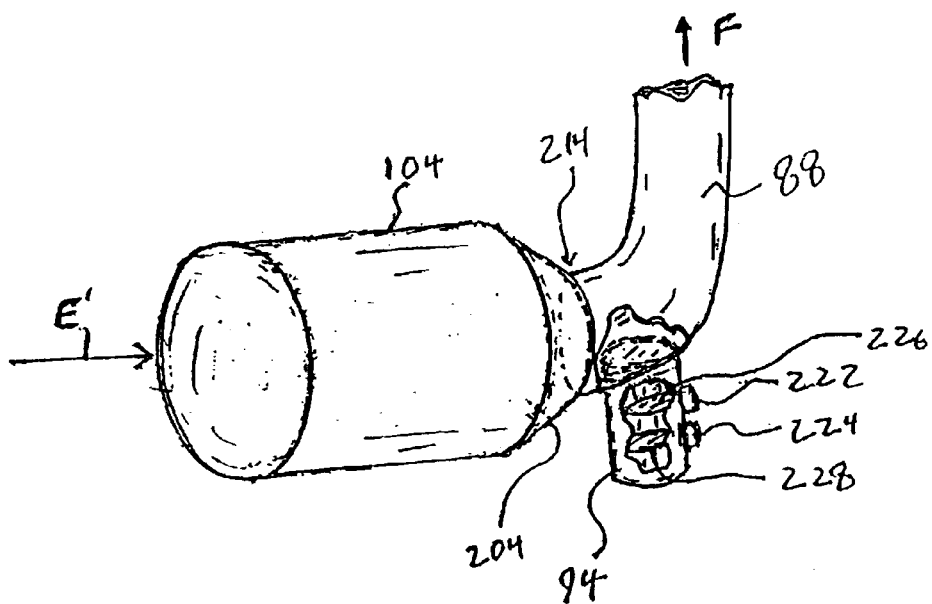
FIG. 6 is a schematic perspective view of a tail section of the kiln of FIGS. 1A, 1B and 2.

Tail or final section 204 (FIG. 6) is conical in shape, and connects drum 100 with riser or fluff transport tube 88. In the tail section of the rotating drum special additional paddles (not shown) are installed. A geometrical shape of these paddles conveys a residual, moderate weight, not yet air-entrained fraction from a relatively wide cross section of inner drum 100 to a restricted throat 214 at an entry to the fluff transport tube. At the throat an increased air or gas velocity of a flow E',F entrains a final fraction of particulate waste for segregation at a cyclonic separator 92 (FIG. 1B), as discussed below. A drop tube 94 is connected to a lower curved part (not separately designated) of plenum 88, and is equipped with two large size flapper valves 226, 228, located approximately 300 mm apart from each other. The heavy fraction is periodically eliminated from drop tube 94 by a synchronized action of valve controllers 222, 224, mounted below the drop tube, actuating upper and lower flapper valves 226, 228 respectively in a sequence of opening of the upper valve, closing of the same valve, and opening of the lower valve. This sequence allows the discharge of the heavy fraction in a bin (not shown) located underneath drop tube 94, without a continuous and uncontrolled venting of exhaust gasses, and while maintaining a positive overpressure inside the casing.

A longitudinal cross section of a second, preferred, embodiment 230 of a rotatory kiln is shown in FIG. 8. Kiln 230 shares key functional features of kiln 84, including a rotating drying chamber, and employs a single wall rotating drum 232 provided with concentric annular baffles 234, 236 et al. and paddles 240, 242 et al., homologous to baffles 184, 186 and paddles 190, 192 et al. of drum 100 (FIG. 5) respectively. In distinction to the paddles of drum 100, paddles 240, 242 et al. are preferably manufactured with a helical shape (not shown). The helical shape, acting in concert with gravity, aids in moving particulate matter along a length of longitudinal axis CL' of drum 232, in a direction urged by airflow E, F.

Kiln 230 additionally comprises non-rotating end sections 244, 246, constituting a feeder and exhaust or exit section, respectively. Feeder end section 244 in turn comprises an intake plenum 248, a feed hopper 250 and a mixing plenum or chamber 252. Hot high velocity flue gas admitted through intake plenum 248 at approximately 90 ft/sec impacts and is mixed with moist fluff (not shown) in mixing chamber 252 admitted through feed hopper 250. The impact is sufficient to move heavy and light fractions of moist fluff into an entry vestibule area 254 of drum 232. Flow velocity falls to a value of 20 to 25 ft/sec upon entry into the vestibule, whereupon a heavy fraction HF substantially falls to a lower inside surface (not separately designated) of drum 232. Light fraction LF is however immediately entrained in airflow E, F and moved towards exhaust section 246. As fraction HF is urged through kiln 230 in a direction concurrent with airflow E, F by aforementioned effects of blade or paddle shape and gravity, simultaneously subject to repeated lofting by rotation of drum 232 transmitted via paddles 234 et al., an increasing fraction of particulate matter is dried and recruited by entrainment in airflow E, F to join fraction LF for eventual removal via an exhaust plenum 88 in section 246. A residual heavy fraction RHF is eliminated by falling into a shaft or drop tube 94, which is regulated by two large size flapper valves, as is shown in greater detail in FIG. 6, for eventual discharge onto a belt system, schematically shown at 96 in FIG. 8. Special paddles 262 et al. urge the heavy fraction towards centerline CL in a conical section 266, similarly to the previously discussed embodiment. The residual heavy fraction comprises principally metals and inorganics.

Cross sections of drum 232 are shown in FIGS. 9 and 10, illustrating, in particular, an increasing constriction of airflow E,F by a sequential reduction of an inside diameter of annular baffles 234 et al., in a direction towards exhaust section 246. Airflow velocity thus increases gradually in a similar direction from a low of approximately 20 ft/min in the entry vestibule to a value of approximately 25 ft/min in a vicinity of the exit vestibule, thereby entraining increasingly larger grade fines in fraction LF, while yet giving all recruited particulate a maximal time to dry. The design, by this method, serves to increase a range of particle size captured in an exhaust stream, while maintaining a required level of drying, by avoiding recruitment of slightly heavier moisture laden particles into an output stream too early in a drying process. Drying dwell times for a critical range of particle sizes and weights are thereby increased without an excessive lengthening of the kiln or drier; dried particles in this range are incorporated into the exhaust stream, while moist particles of a similar initial characteristics still maintain an adequate dwell time in the kiln, avoiding premature entrainment. Airflow velocity returns to a full velocity of approximately 90 ft./min. in exhaust plenum 88 following a final constriction in conical section 266 of exit section 246.

FIGS. 9, 10 also illustrate a placement of a heavy fraction passage slot 238 in ring shaped or annular baffles 234. The passage slots (other not shown) permit a gradual passage of recalcitrant elements of fraction HF, eventually segregated in residual fraction RHF, through the kiln, while giving a maximal dwell time for possibly recoverable particulate. Further shown are support and drive rollers 268, 270 and 268', 270'. Compared to a twin shelled embodiment, a single-shell kiln 230 permits a substantial simplification in drive and bearing complexity, as rollers may simultaneously serve drive, bearing and structural support functions.

A mode of operation of kiln 84 or 230 is controlled by a selection of the following variables: airflow rate (velocity); air temperature; rotation speed of the drum; and inner diameter of the rings. A basic principle of operation of the kiln employing rotating internal drum 100 is to present dryable material with a sufficient and intimate exposure to heated gas to dry and air-entrain an economically satisfactory fraction thereof, while providing eventual passage and elimination of a recalcitrant non-dryable fraction. A meaning of "economically satisfactory", including considerations of dwell-time in the kiln, energy efficiency and a value foregone on a non-captured fraction of dryable material, is a design decision to be optimized by those skilled in the art for a particular configuration of capacity and expected quality of waste stream. An air flow rate, and therefore its velocity, is calculated in a way to transport the dried material (lighter) out of the drum and let the heavier material reside longer by forcing it to pass through the baffles.

Considering further a preferred mode of operation of a kiln in support of the present invention in relation to kiln 230 or 84 a maximum exit temperature of the material from the kiln is about 150° F. An exhaust gas flow exiting the kiln through plenum 88, comprising mainly heated air, is at a temperature of 190° F. The exhaust gas is water saturated and is aspirated by a ventilator 90 to the cyclone or cyclonic separator 92. From cyclone 92 the exhaust gas is routed to a jet scrubber or air pollution control device (not shown), through a third plenum 95.

Solids exiting kiln 230 or 84 are segregated into a light, air entrained, fraction, and a heavy, gravity bound, fraction. The heavy fraction (not shown), composed of inert materials such as stone, masonry and ceramic fragments, a remainder of a ferrous metal fraction, and all non-ferrous metals, is separated at an exit of the kiln through drop tube 94 onto a third conveyor belt system 96. A third magnetic overhead belt 98 is instrumental in a third and final separation step of the ferrous metal fraction. Magnetic materials falling off magnetic overhead belt 98 are collected in receptacle 110 for further processing (not shown), joining similar ferrous metal streams falling into receptacles (not shown) at locations of magnetic overhead belts 68, 78. A remaining residue 112 of heavy fraction falling from belt system 96 is collected for eventual disposal.

The light fraction or fluff residue is entrained by air or exhaust gas flow in plenum 88, from whence the fluff enters cyclone 92. In the cyclone light fraction solids gradually lose velocity, while tending towards a center of a cyclonic flow (not illustrated), and eventually falls through a throat 114 to a holding or mixing tank 116. From the holding tank fluff or cyclonic precipitate 124 is fed via a conveyor belt 118 through a fifth hopper 120 to a holding or buffer compartment 156 in a twin screw extrusion machine 122, for production of compressed solid briquettes.

Some general features of twin screw extrusion machines, known in the material processing art, are illustrated in FIG. 3. A main body of the machine is constituted by a compacting chamber where two screws made of special alloy are located: A right-hand threaded helical screw 124 and a left-hand threaded helical screw 126 are disposed in an interlocking manner inside a case 128. Helical screws 124, 126 function in this application as briquetter screws, and may be so designated. A series of isolated compartments or voids 138 et al are formed by screw 126 and case 128, in particular by shaft face 130 and thread lands 134, 136, in conjunction with a thread face 142 of screw 124. A symmetrically disposed series of compartments (not designated) is formed by screw 124 and case 128, in conjunction with a thread face 144 of screw 126. Screws 124, 126 are disposed to allow a counter-rotatory motion, indicated by arcuate arrows, whereupon isolated compartments 138 et al are translated in a direction parallel to a longitudinal axis of the screws, as indicated by a solid arrow. Material entrained in compartments 138 et al. is thereby urged in a direction of the solid arrow and, when fed in a proximal end 146 of the twin-screw extrusion machine, the material is eventually ejected at an opposite distal end (not shown) of the extrusion machine, and potentially with great pressure.

Further internal details of a twin-screw extrusion machine or extruder contemplated in a best mode embodiment of the present invention may be seen in FIG. 4. A screw 148 having a shaft 149 (one of two briquetter screws shown for clarity) is mounted in a casing 150, and supported by an axial or thrust bearing 152 mounted at a top or feed end of the screw, proximate to the holding compartment 156, and a radial or side-load bearing 154, proximate to a die end 158 of the extrusion machine. Die end 160 is mounted with an exchangeable die 160 having a die throat 162. Bearing 152 takes up thrust or reactive loads resulting from forcing of an extruded waste-derived product (not shown) through die throat 162, while bearing 154 takes up or supports side to side loads resulting from any imbalance or inhomogeneity in a product or material in process. Bearing 152 also functions partial in a radial mode in assisting bearing 154 in supporting a static weight of the screw. A clearance (not separately designated) between the two briquetter screws, and between each screw and the casing, is chosen as a compromise between narrow clearances, favoring maximum air transport and compression, and looser clearances, at the same time providing a safe passage of metal and other heavy particles possibly entrained by the material in process. A depth of thread d (FIG. 4) is also chosen by design relative to an intended throughput of waste material to create inter-wrap void spaces 172 et al. of size appropriate to entrain a volume of air sufficient to heat in-process material to a working temperature range.

It may be seen in FIG. 4 that a drive shaft 164 passes through the holding compartment and is joined to screw 148 in a vicinity of the thrust bearing, providing a dynamic torque, or motive power, to the screw. A second shaft (not shown) in parallel to shaft 164 similarly passes through the holding or buffer compartment and is connected to the remaining briquetter screw. At an opposite end, first and second drive shafts are joined to a reduction gear box 166, as shown in FIG. 1B. The gear box is functionally connected to a direct current (DC) motor 168, and serves to reduce an rpm of the motor to turn the briquetter screws with great and compelling torque, urging primarily solid and relatively low moisture content precipitate from the cyclonic separator 92 forward under sufficient pressure, and with sufficient generated heat, to fuse the precipitate into an extruded solid waste-derived product. For briquetting screws of from 300 to 1200-mm diameter, and preferably constructed of a high wear resistant alloy of 400 or 800-mm diameter, and having a length to diameter ratio, or aspect ratio, in a range of 1 to 2.5, electric motor 168 is appropriately rated between 400 and 1,000 kW. The motor is controlled by a preferably solid state inverter (not shown), and operatively connected at a drive shaft to the gear box or gear reducer 166. Direct current supplied by solid state inverters is preferably utilized as a power source over other forms of power, such as AC or lower quality DC with appreciable AC ripple, in order to allow smoother control of torque, and a smooth extrusion of product. Modern electronic motor controls are capable of responding on an effective time scale to inevitable variations in torque as a naturally varying waste-derived feedstuff is passed through the twin-screw inverter, maintaining uniform pressures and temperatures at an output end thereof: the motor may be controlled to output at constant torque, or constant rpm. Uniformity of control permits creation of a briquette product as uniform as possible, and thus of maximum market value. Briquette density can reach values of up to 3,000 lb/yd$^3$ according to characteristics of the waste handled and the temperature profile set inside the briquetting machine.

Figure 4:
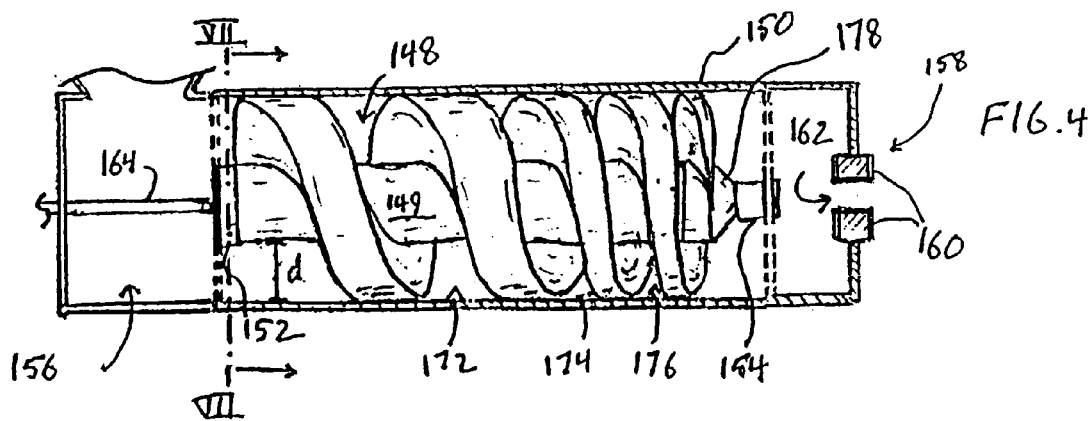
FIG. 4 is a schematic elevation a variable pitch screw of a twin-screw extruder.

Another feature of the twin screw extrusion machine 122 is evident from an inspection of FIG. 4. Briquetter screw 148 and its intermeshing companion screw (not shown) are of variable pitch, decreasing from a top end (not designated), proximate to compartment 156, to a discharge end (not designated), proximate to die throat 162. As a consequence of this varying screw pitch it may be observed that inter-wrap spaces or voids 172, 174, 176 et seq. are of diminishing size. Thereby, as a portion of material entrained in an inter-wrap void 172 is urged from the top end to the discharge end of the screw, the void is becoming progressively smaller in volume, resulting in a progressive compression of the entrained material. Sufficient clearance is provided between screw 148 and casing 150 to allow escape of expressed gasses resulting from heating and compression of entrained material in a top-end direction, towards and through holding compartment 156, whence the gasses are captured by an overhead aspiration hood and routed to the scrubber. Optionally an end or die section of the extrusion machine is provided with slots (not illustrated) to allow the discharge of the air and the steam formed by the evaporation of the residual moisture contained in the material. The slots are built and configured to prevent any overflow of material. Additional ventilation equipment (not shown) may collect gasses evolved from compression of the fluff, and direct them to the jet scrubber.

Figure 7:
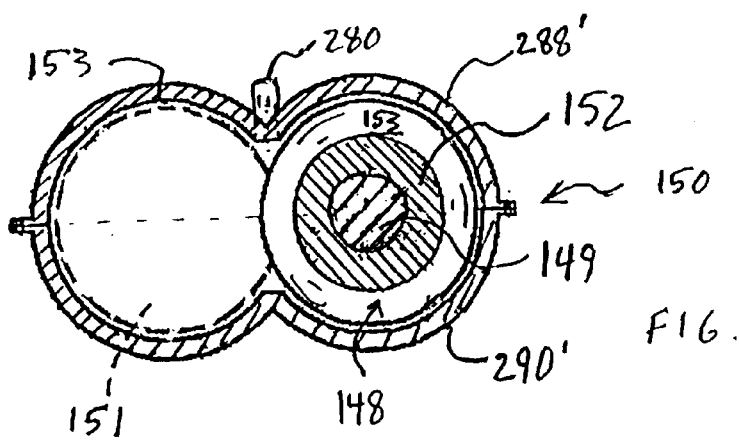
FIG. 7 is a cross section of the extruder of FIG. 4.

A cross-section of the extruder of FIG. 4 is shown in FIG. 7. Casing 150 is comprised of an upper shell 288' and a lower shell 290'. Screw 148 has a thread face 153 helically disposed on a shaft 149. At a proximal end (not designated) shaft 149 is supported by a thrust bearing 152; a second screw 151 is shown in outline. Radial bearing 154 (not shown in this view) is mounted at a distal end of screw 148, as seen in FIG. 4. An optional vent 280 seen in FIG. 7 is also found at a distal end of the extruder, releasing gases expelled from extrudate at the high pressure distal end of the extruder, which do not escape axially through a circumferential annular clearance 153.

Figure 11:
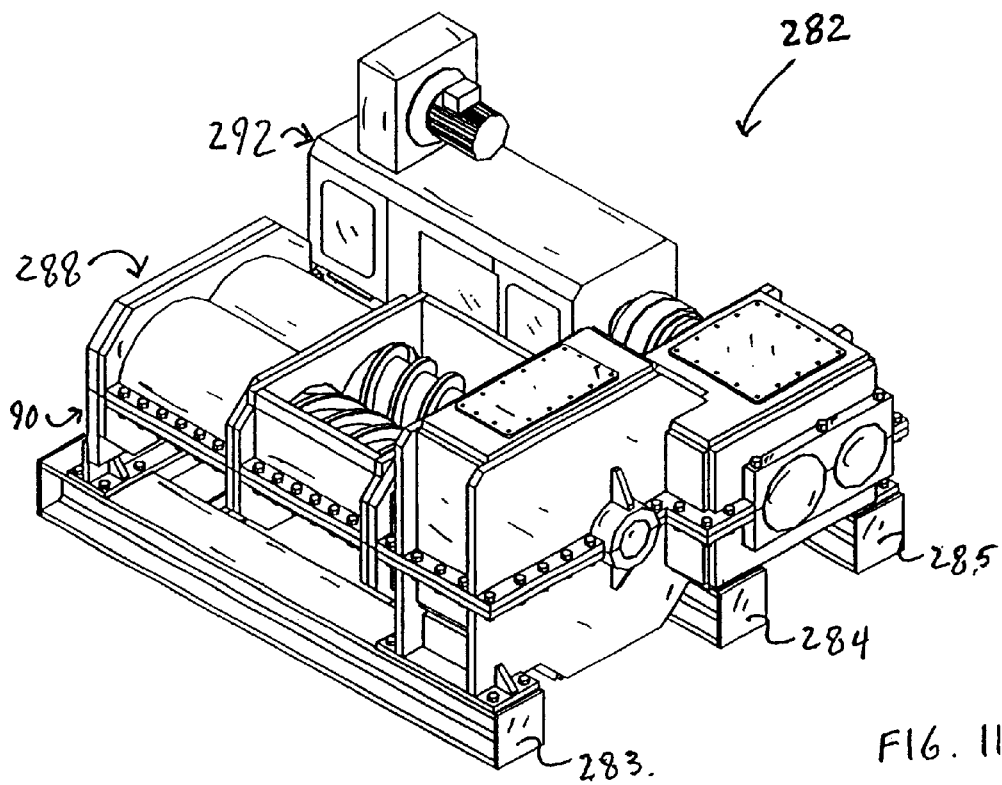
FIG. 11 is a schematic view from an elevated left rear perspective of a complete extrusion machine embodying in the mechanism of FIG. 3.
Figure 12:
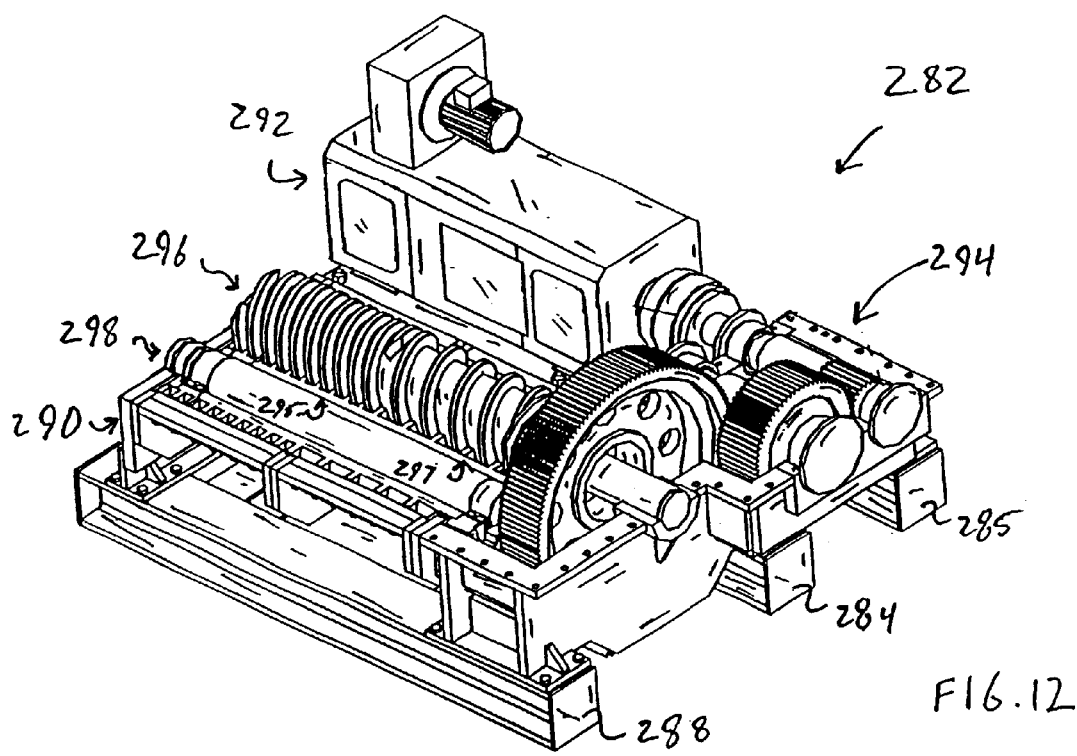
FIG. 12 is an schematic perspective from an identical viewpoint of the extrusion machine of FIG. 11, partially cut away to reveal internal gearing and a variable pitch extrusion screw.
Figure 13:
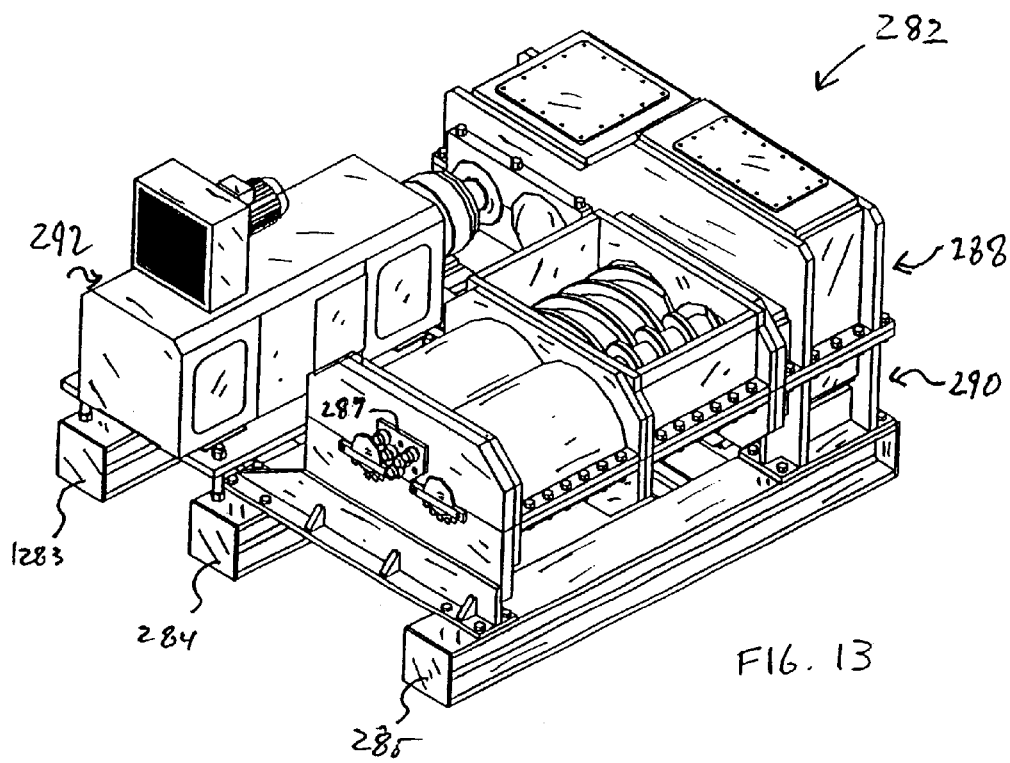
FIG. 13 is a schematic view from a elevated front left perspective of the extrusion machine of FIG. 11.
Figure 14:
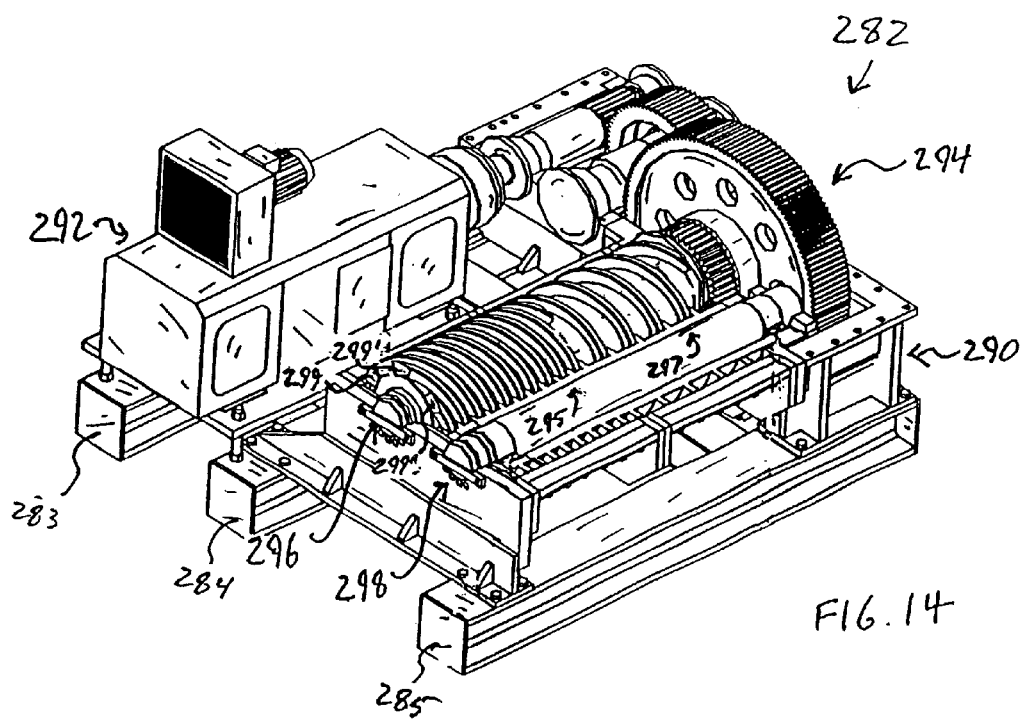
FIG. 14 is an schematic perspective from an identical viewpoint of the extrusion machine of FIG. 13, partially cut away to reveal internal gearing and a variable pitch extrusion screw.

In an further embodiment of a extruder (FIGS. 11, 12, 13, 14), an additional feature of the briquetting or extrusion screws contemplates a composite or modular screw comprising a plurality of sections of constant screw pitch bolted together along a longitudinal axis in order to form a single contiguous screw of varying pitch. In return for a loss in smoothness of operation and a continuously graded compression of waste material in process as compared with the previously described variable pitch screw 148, of unitary construction, a simplicity of manufacture is gained and an elimination of a need for the complex machined shape of the variable pitch screw. FIG. 11 et seq. show a complete embodiment of an extrusion machine 282 (not separately designated) employing a multiple pitch screw according to the above described construction.

Base members 283, 284, 285 of machine 282 (FIG. 11) support an integral box frame and casing, comprising an upper shell 288 and a lower shell 290, and a power unit 292. The upper and lower shells encapsulate reduction gear train 294, and twin extruder screws 296, 298, as shown more clearly in partially cut-away view in FIG. 12, which illustrates the extrusion machine with upper shell or casing 288 removed. Extruder screw 298 is also shown partially cut-away, with a partial section of threads (not separately designated) removed for clarity. Multiple pitched thread sections can also be seen in FIGS. 12 and 14, comprising, in this embodiment, a steeply pitched thread section 297 of three flights (not separately designated), and a more shallowly pitched thread section 295 of six flights, a feature more clearly understood by examination of FIG. 14, wherein downstream thread flight ends 299, 299', 299" can be seen above lower casing or shell 290, an additional three flight ends (not designated) being obscured in this view by lower casing 290. An interchangeable extrusion die 287 may be seen in FIG. 13.

In yet an additional feature of either a unitary or segmented briquetter screw, which may be best understood for an examination of the embodiment of FIG. 4, an end cap section 178 of approximately 200–250 mm in length and comprising a section of the extrusion screw proximate to die throat or discharge port 162, is manufactured as a separate unit, bolted on to a remainder of the screw. The end cap section endures a maximum wear rate, being subject to highest process pressures, and provision of a separate bolt-on section facilitates economical maintenance. In a modular embodiment of the extrusion screws a overall screw length may also be varied in accordance with a type of waste to be treated, in conjunction with a modular or extensible machine framework, thus conferring a degree of flexibility on a plant which may be converted from one waste processing role to another with a reduced degree of retooling costs.

Continuing a process description for either embodiment of an extrusion machine, fluff 124 with a residual moisture content in a range of 10–15%, or preferably 10–12%, is further ground and mixed in an initial section of the briquetter screws and increasingly compressed and pushed to an extrusion die area by rotation of the screws. A majority of the energy provided by the electric motor is dissipated into heat by friction, which raises material temperature and causes residual moisture to evaporate. In particular, if moisture content of material entering the briquetter is no higher than a preferred design value of 12%, a temperature of the material exiting the extruder will generally be in the range of 250–280 F., depending on the origin and composition of the fluff. A working temperature internal to the machine is preferably in a range of about 250–320° F., and is typically reached within a few minutes of process start-up. Heating of in-process material in the extruder or briquetting machine is essentially a conversion of motor power into waste heat by dissipative mechanism, and in particular via two mechanisms: (a) Friction of the waste material with internal components of the machine, including especially the extrusion screws and the exit die. (b) Compression of entrained air (adiabatic compression) along a length thereof to an exit die. The latter process or mechanism is not totally dissipative but has elements of active heat transfer, or heat pumping: An expansion of escaping compressed air at the exit die, and an optionally installed vent 280 (FIG. 7) in a vicinity thereof, has an effect of adiabatic cooling, thereby accelerating a return of extrudate to room temperature, and allowing an exit temperature in a range of about 200–245° F. or higher, concomitant with an internal working temperature in a range 250 to 320° F.

Fluff entering the twin-screw extrusion machine possesses rheological and mechanically cohesive properties of a loose aggregate. The finished briquettes however cool to a stable, dry, solid condition. The exact mechanism of fusion, or creation of a cohesive and stable solid from a loose particulate aggregate, is not known, but is thought to involve chemical bonding among uncharacterized organic molecules present from various sources in a municipal waste stream. Regardless of mechanism, it is observed in practice that composite waste over a wide range of compositions sources from municipal solid waste, sewage sludge, and combustible industrial residues, may be successfully reduced by the disclosed process to a uniform, biologically and chemical stable product.

Briquette stock or extrudate (not designated) exiting the die throat is taken off, or removed from a vicinity of the die throat, by a motorized roller supported conveyor 180, and is cut to length by a circular cut-off saw 170. Transverse dimensions-of a finished briquette product are determined by selection of an exchangeable die 160: a machine configuration allows the use of different extrusion dies to produce different briquette shapes and sizes ranging 30 to 180 mm according to their final destination. Considerable flexibility thus exists in determining dimensions of finished briquettes in response to product requirements.

A packing plant is composed of two sections: in the first section the briquettes are assembled in layers to form packs of approximately 2.4 cubic yards. In the second section the packs so formed are secured and bound with four vertical plastic or steel bands and one horizontal. According to their final destination and use, the packs may be shrink-wrapped in polyethylene foils on five side of the cubes. As previously mentioned the packs may include varying numbers of layers or briquettes to assume different desired shapes.

Figure 15:
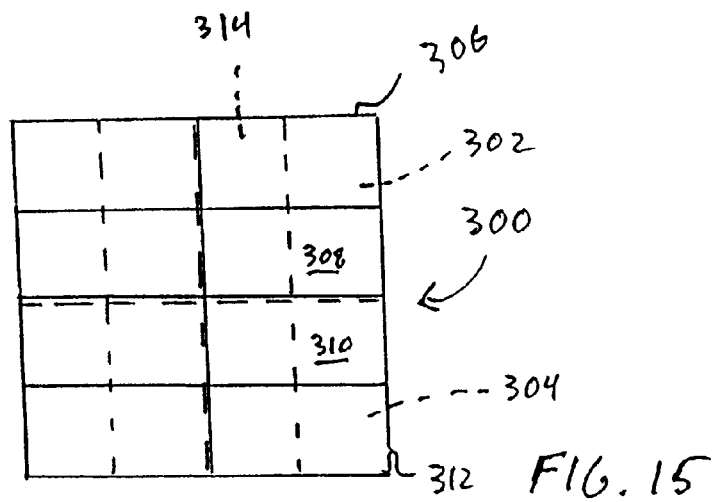
FIG. 15 is a schematic plan view of overlapping layers of briquettes packed in an alternating geometric pattern in accordance with a feature of the present invention.

In a particular operation configuration, briquettes intended for disposal in a landfill are produced with a square cross section with approximate linear dimension 6.9" and an aspect ration of 1:7 are laid next to each other on 7 cross-ply layers of 7 briquettes each, to form a cube of 4 feet in size, suggestive of a stack of rail road ties. The cube is secured with metal or plastic bands. Alternatively, briquettes produced with other non-unitary aspect ratios, say 1:1:2, may be stacked for additional strength in traditional brick-laying patterns, or "bonds". FIG. 15 illustrates a basic two-layer pattern of "English" bond where, on each exposed face of a block or cube, headers alternate with stretchers. On face 300, bricks or briquettes 302, 304 on an upper layer (not designated) are stretchers, showing a long face, while bricks 306, 308, 310, 312 on a bottom layer are headers, showing an end face. It may be seen that bricks 302, 314 and bricks 306, 308 on adjacent layers overlap, increasing strength of a block during subsequent handling.

Figure 16:
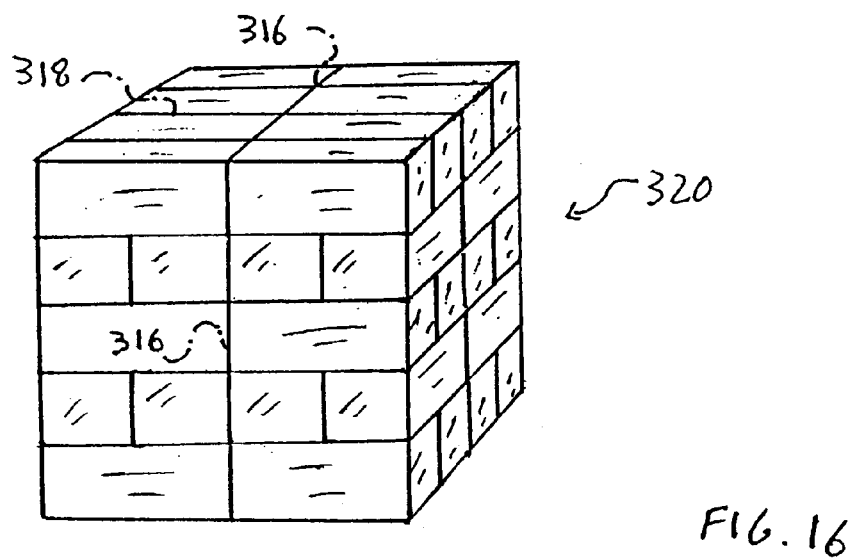
FIG. 16 is a schematic perspective of a block formed by a repetition of the alternating pattern of FIG. 15.
Figure 17:
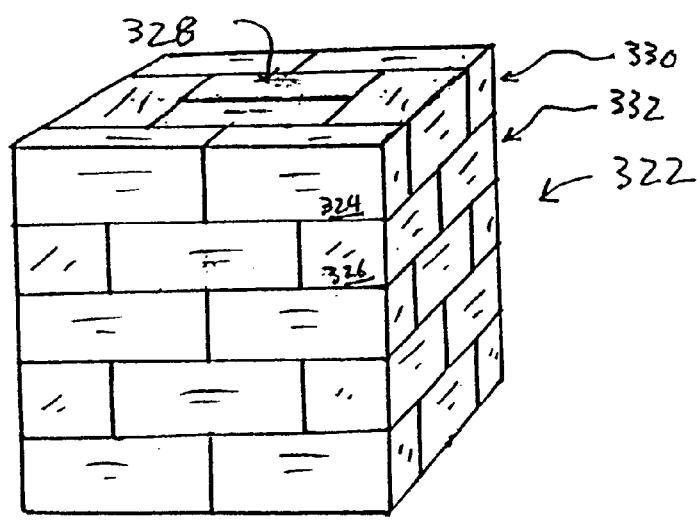
FIG. 17 is a schematic perspective of a block formed by an alternating pattern of packing modified from that of FIG. 16.

A repeated layered form of a pattern shown in FIG. 15 results in a solid composite block 320 illustrated in FIG. 16. The block of FIG. 16 however still contains two vertical through seams, 316, 318, and so amounts to four uncoupled stacks of bricks or briquettes. Additional strength can be developed by adopting a fully overlapping layer pattern, as shown in FIG. 17. Each face of a block 322 is in effect laid in "stretcher" or "running" bond, which consists of offset rows of all stretchers; with a modification that headers turn each corner, to become a stretcher on an adjacent face here, as illustrated by bricks 324, 326. An inner core of bricks 328 complete solid block 320. It may be noted that block 320 can be formed by a 90 degree rotation of adjacent layers; a layer 332 being rotated 90 degrees relative to a top layer 330, and so forth. Other schemes for solidly and strongly packing blocks of uniform shape may occur to the skilled artisan.

A packed form of waste as described above may be conveniently and economically transported by flat bed truck or rail, ameliorating practical problems and possibly also some political problem of transporting waste between communities for disposal. Packs so formed can be further loaded on rail cars in lots of up to 100 tons of processed waste per 55 foot high side gondola car; while the equivalent amount of unprocessed waste would require a minimum of three cars and additionally require containerization for transport into the rail system. The present invention allows the transportation of large amounts of waste to remote landfill facilities at a cost and with an environmental, a possibly political, impact greatly reduced with respect to that of unprocessed municipal waste.

A major improvement introduced by this invention compared to other recently developed waste processing technology is a mitigation of environmental impacts associated with landfill waste disposal. Landfilling waste processed via this invention eliminates or substantially reduces atmospheric emissions caused by the biological degradation of unprocessed or minimally processed landfilled waste. Landfilling waste processed using this invention also reduces groundwater contamination during landfilling operations, and subsequent to landfill closure. A greater density of processed, landfilled waste substantially reduces the transfer rate of chemical constituents from processed waste to groundwater as a result of contact with percolating precipitation and with groundwater.

Because waste processed in accordance with the present invention is biologically inactive, and remains so after landfilling, and because there is a lower transfer rate of chemical constituents to precipitation and to groundwater in contact with the processed waste, the precipitation and groundwater which comes in contact with processed, landfilled waste which are deemed leachates for purposes of Title 40, Chapter I, Parts 247 and 248 of the United States Code of Federal Regulation have lower biological and chemical loads than landfilled waste which is not processed with this invention.

Another major improvement introduced by this invention is that processed, landfilled waste does not generate waste odors, or attract birds, vermin and other pests, substantially reducing environmental and aesthetic impacts of landfill waste disposal upon communities in close proximity to landfills and transport routes to landfills. The product is a uniformized commodity, and may also be more acceptable than a variable, bioactive precursor to the product.

Another advantage of the present invention is that refuse derived fuel can be created which is chemically and biologically stable, as well as reasonable compact, and therefore suitable for storage and transport in a manner approximating use of a traditional solid or liquid fuel stuff, such as coal or oil. Even if fuel usage is not economically viable now, landfills filled with aseptic briquettes can be subsequently mined as a fuel source when economic conditions warrant. MSW processed in accordance with the present invention may be considered a form of artificial coal or peat, laid in the ground for possible future utilization.

Although this invention is primarily described in terms of processing a municipal waste stream for eventual use in stable landfill or power generation processes, other types of waste, including agricultural and industrial, may also be processed into a stable compact form. Initially high-moisture content fermentative agricultural wastes can be stabilized and stockpiled for possible eventual use as fuel, while waste streams containing both organic matter and toxic chemicals and metals can be stabilized and compacted for permanent or semi-permanent burial, reducing a volume of required landfill, an area of required leachate containment and collection, and a load of evolved leachate per waste ton per year, all factors substantially reducing a cost of hazardous waste disposal.

Having generally described the invention, reference is now made to the following examples which are intended to illustrate preferred embodiments and comparisons but which are not to be construed as limiting to the scope of this invention as is more broadly set forth above and in the appended claims.

EXAMPLES

CHARACTERIZATION OF BRIQUETTES PRODUCED BY MEANS OF THIS INVENTION

The disposal of briquettes formed in packs or as loose items at landfill sites can be realized if the briquettes respond to certain characteristics in terms of mechanical strength and ability to withstand attack from atmospheric agents.

To this end, three sets of parameters are measured to fully characterize the behavior and the properties of briquettes originated from MSW.

These parameters are:
  Mechanical properties
  Biological properties
  Chemical/physical stability in relation to leaching characteristics 1) Mechanical Properties In general, mechanical properties of briquettes produced by means of this invention are a function of many variables such as trash composition, ground size distribution, moisture content at the end of the drying process, efficiency in the removal of metals and inert, temperature profile inside the briquetting machine during the final stage of the process Briquette density and overall mechanical resistance improve with lower moisture content in the dryer and in the final products, higher weight of organic matter in the MSW of no more than 50%, and higher temperatures inside the briquetter with a limit of 300° F.

For sake of sampling consistency and evaluation of related characteristics several samples are prepared using the same MSW composition and applying different processing variables as described above.

The MSW composition of reference is determined as follows:

| Paper and cardboard | 31.2 |
| Plastics | 5.7 |
| Glass | 2.1 |
| Metals | 10.5 |
| Organics | 40.3 |
| Inorganics and other waste | 9.2 |

The compression resistance of the samples is measured. It is generally found that samples obtained by eliminating organic matter from the MSW presented lower densities and poor mechanical properties. Samples obtained by eliminating plastic and paper showed even lower properties. Plastic and organic matter function as binder to each other and have to be present in certain proportions in the final briquettes if good mechanical properties are desired. In this respect it is found that a total of 30% of paper and plastics in the original waste represents an optimal value.

The compression resistance can be determined by measuring two non correlated properties used to characterize coal, a proxy for the briquettes. These properties are compressive strength and Hardgrove Index (ASTM D409).

Samples at the lower end of the density scale (<1,300 lb/cuyd) yielded values of compressive strength yield between about 500 and 700 psi and Hardgrove Index well below 20. Samples with density of 2,400 to 2,800 lb/cuyd yield values of compressive strength of 8,000 to 10,000 psi and Hardgrove Index of 60 to 80.

In particular, the sample that produces the best test results (Sample T) had a density of 2,750 lb/cuyd and is obtained from the waste composition of reference with the following processing sequence:

A two step grinding to obtain a maximum ground size of 40 mm.
  Drying in the kiln to a moisture content not greater than 9.5%
  Quantitative removal of metals with retention of max. 0.3% of inert
  Extrusion in the briquetter at temperatures increasing from 260° F. to 280° F. to yield briquettes with moisture content of 4.3%.
  Sample T indicated compressive strength of 9,600 to 10,000 psi and Hardgrove Index of 78 to 80. All samples are cut to a cube of two inches.

2) Chemical/physical Stability in Relation to Leaching Characteristics

For this kind of test the typical TCLP (Toxic Characteristic Leaching Procedure) Method 1311 analysis is performed. In this analysis demineralized pure water in predetermined quantities is used in contact with 100 grams of Sample T. At certain intervals of time the weight of the water can be measured and analyzed for content whenever weight measurement indicated any variation. A first measurement is taken after a period of 3 minutes and indicated the presence of carbonates and silicates of sodium, calcium and magnesium in quantities not exceeding 60 mg. The presence of these salts in the water can be ascribed to process dust derived by the cutting of the sample. A second measurement taken after an additional period of three minutes indicated no presence of any salt and no variance in the weight of water. Sample T is dried out at the end of the test and then weighted to verify the presence of water adsorbed during the test. No significant change of weight is noted except for the amount of dust measured in the water.

3) Biological Properties

The biological stability and inertness of the briquettes can be determined with an autoclave (4.4 cuft) test in which a briquette of Sample T measuring 2 cubic inches in size and weighing approximately 200 grams is immersed in a bath of water to measure possible swelling and weight variation of the briquette. It should be noted that the briquette used for the test represents a worst case scenario with regard to biodegradation test. In fact the size of the briquette is only fractional compared to the size of the briquettes disposed at the landfill. (e.g. a few inches in length as opposed to several feet). Therefore the test is very conservative because smaller size briquette have a larger surface area which can be attacked by water, steam or other agents.

After immersion in water and by maintaining room temperatures inside the autoclave, the weight of the briquette is monitored at equal intervals of 12 to 24 hours for a period of 2 weeks. There is no significant variation in weight, which indicates that briquettes of composition and characteristics such as those of Sample T are biologically inert at those conditions.

In order to simulate environmental conditions experienced by the briquettes at a landfill, a second test is conducted on another briquette of Sample T of the same size and weight previously used. The briquette is introduced in the autoclave and exposed to water at pH of 5, much closer to those of acid rain and water streams running at landfill sites. The presence of acid ions in the water would cause certain metals and refuse components to become soluble in the water if the briquette is not chemically stable.

Even in this case no significant change in weight is experienced giving support to the assumption that briquettes of Sample T are biologically and chemically inactive.

Environmental conditions at a landfill could be in some cases more severe than those described in the above tests. Temperature can be as high as 120° F. and moisture of air can be close to saturation.

The combined effect of oxygen, moisture and temperature represents the biggest threat to the stability of the briquettes.

In order to test the stability of the briquettes in these conditions more aggressive tests can be arranged. In this test a similar briquette of Sample T is introduced in the autoclave and exposed to air saturated by steam at a temperature of 140° F. for a period of 3 consecutive days. The conditions of this test are really more severe than those at the landfill, being close to those of adiabatic saturation. In fact, at the landfill the air (never fully saturated) is moving away from the briquettes and has a contact time with the briquettes of a few seconds and not days. Temperature is also rarely higher than 120° F. and only for a few hours a day. To verify whether any significant degradation had occurred, a gas chromatograph is used to check the presence of methane and carbon dioxide in the autoclave environment, typical indication of a biofermation process in act. The test is qualitative, as it aims at establishing the presence of biodegradation products inside the autoclave.

This test is very probing because the presence of oxygen at high temperature normally generates the formation of free radicals, active chemical species, which are very reactive and fast in causing mutation of the chemical structure of the briquette. If no biogas is found in these conditions, it can be assumed that it will never be formed.

Serious concerns may arise from the anticipation of future behavior of briquettes stored at a landfill for extended periods of time (>10 years) with regards to their biodegradation.

One last test can be conducted to establish the stability of the briquettes long term, measuring biodegradation properties in an extremely hostile environment to simulate exposure to landfill conditions for periods of 10–20 years.

In this test overheated steam (220–240° F.) at atmospheric pressure is used in presence of air in the autoclave for a period of three days; the same measurements of the previous test is used to indicate the presence of biogas, which could be put in direct relation with the long term stability of the briquettes.

Even in these very severe conditions the chromatograph did not indicate the presence of any methane or carbon dioxide. The performance of this last test indicates that no change in the biological characteristics of briquettes of Sample T produced by means of this invention should be experienced.

The invention is therefore not to be construed as limited to the particular examples provided herein by means of illustration, but to be understood generally, as bounded by the appended claims.

What is claimed:

1. An aseptic briquette having a density of about 1,000 to 3,000 $lb/yd^3$, a moisture content of less than approximately 10% by weight, and being biologically inert, comprising:
at least one component selected from the group consisting of sewage sludge solids, municipal solid waste and refuse derived fuel.

2. The briquette of claim 1, wherein said briquette has a density of about 2000 to 2400 $lb/yd^3$.

3. The briquette of claim 1, wherein said briquette has a moisture content of less than about 7% by weight.

4. An aseptic briquette having a density of about 500 to 5.000 $lb/yd^3$, a moisture content of less than approximately 10% by weight, and being biologically and chemically inert under conditions encountered in a lanfill for a period of no less than about 1 year and, comprising:
at least one component selected from the group consisting of sewage sludge solids, municipal solid waste and refuse derived fuel.

5. The briquette of claim 4, wherein said briquette has a density of about 2000 to 2750 $lb/yd^3$.

6. An aseptic briquette having a density of about 2,000 $lb/yd^3$ to about 3,000 $lb/yd^3$, a moisture content of less than about 7%. compressive strength ranging from about 5.000 psi to about 15.000 psi, containing less than about 0.3% by weight metals; able to be stored under average daily temperate zone conditions for a period of at least about 5 years and comprising at least one component selected from the group consisting to sewage sludge solids, municipal solid waste and refuse derived fuel.

7. An aseptic briquette having a density of about 500 $lb/yd^3$ to about 5,000 $lb/yd^3$, compressive strength ranging from about 500 psi to about 15.000 psi and containing less train about 0.3% by weight metals and moisture content of less than about 5% by weight of said briquette and comprising:
a mixture of refuse derived fuel and at least one additional component selected from the group consisting of sewage sludge solids and municipal solid waste.

8. The briquette according to claim 7 which further comprises crushed coal or petroleum in an amount ranging from about 0.5% to about 50% by weight.

9. The briquette according to claim 7 which further comprises crushed coal and petroleum in an amount ranging from about 0.5% to about 50% by weight.

10. A method for producing a biologically inert or aseptic briquette comprising:

providing a waste material stream comprising one or more materials selected from the group consisting of municipal solid waste, refuse derived fuel, automobile tires, and municipal sewage sludge;

processing said waste material stream as required to produce fluff of at least 95% by weight particle size of no greater than 4 inches in dimension; employing a rotating kiln, heated by a methane or waste gas burner to produce a waste intermediate with a residual moisture content of about 10%, and also to remove ferrous and non-ferrous metal particles and inert materials and employing a twin screw extrusion or briquetting machine capable of executing an extrusion operation further reducing a moisture content of a processed waste stream to about 5% while maintaining an extrudate temperature between 250 and 280° F., to produce a biologically inert or aseptic briquette.

\* \* \* \* \*